United States Patent [19]
Steffan

[11] Patent Number: 6,092,333
[45] Date of Patent: Jul. 25, 2000

[54] PLANT CONTAINER

[76] Inventor: Margaret Steffan, 4-140 Strauss Drive, Winnipeg, Manitoba, Canada, R3J 3S6

[21] Appl. No.: 09/261,050

[22] Filed: Mar. 2, 1999

[30] Foreign Application Priority Data

Mar. 3, 1998 [CA] Canada ................................. 2230731

[51] Int. Cl.[7] .................................................. A01G 25/00
[52] U.S. Cl. ..................................................... 47/83
[58] Field of Search ................................. 47/83, 86, 87, 47/47

[56] References Cited

U.S. PATENT DOCUMENTS

D. 207,915   6/1967   Zimmerman .
D. 244,471   5/1977   Cicci .
2,803,923   8/1957   Pratt .
3,293,798   12/1966   Johnson, Sr. .
4,250,666   2/1981   Rakestraw .
5,404,672   4/1995   Sanderson .

Primary Examiner—Thomas Price
Attorney, Agent, or Firm—Adrian D. Battison; Murray E. Thrift

[57] ABSTRACT

The present invention is a plant container which has three separate containers. Each container is positioned at different levels in a tier type shape. The container is mounted on wheels, for easy movement across the ground. Drainage holes are positioned in the bowls and platforms which allow drainage from one bowl to another. The invention can easily be dismantled by simply separating the posts and sliding off the bowls.

16 Claims, 2 Drawing Sheets

PLANT CONTAINER

This invention relates to a container for plants which provides a multi-tier construction for attractive display of a number of plants.

BACKGROUND OF THE INVENTION

In U.S. Pat. Nos. 5,404,672, 4,250,666, 3,293,798 and 2,803,923 and U.S. design Nos. 244,471 and 207,915 are examples of plant holders. They are not suitable for collapsing or dismantling and the examples do not have adequate support structures.

SUMMARY OF THE INVENTION

It is one object of the present invention, therefore to provide a device which is collapsible and is constructed to have an attractive appearance, unlike the examples as mentioned above According to one aspect of the invention there is provided a collapsible multi-tier plant container comprising:

a base plate having a plurality of spaced ground engaging elements on an underside for supporting the base plate on the ground in horizontal orientation;

a first post portion arranged for attachment to the base plate so as stand upwardly therefrom;

a first raised plate for attachment to a top of the first post portion parallel to the base plate;

a second post portion arranged for attachment so as stand upwardly from the first plate;

a second raised plate for attachment to a top of the second post portion parallel to the base plate;

each of the base plate, first plate and second plate having a substantially horizontal top surface arranged to receive thereon a plant bowl;

the first post portion being separable from the second post portion and each of the plates being separable from the post portions for collapsibility of the container.

Preferably the container has a top surface of each of the plates has therein a plurality of holes arranged for alignment with holes in the bowl to allow escape of excess water from the bowl.

Preferably the container has ground engaging elements comprise wheels.

Preferably the container has third post portion attached so as to stand upwardly from the second plate, the third post portion being separable from the second post portion.

Preferably the containers top surface of each plate portion has no raised peripheral rib.

Preferably the container has a top ornament on top of the third post portion.

Preferably the containers top of the third post portion is supported solely from the first and second post portions and thus from the base plate.

Preferably the containers second post portion has a lower end portion which is of reduced diameter so as to fit into the top of the first post portion.

Preferably the containers each of the first plate and the base plate sits on a nut threaded onto a threaded section of the respective post portion.

Preferably the containers each of the plates supports a moulded plastic bowl sifting thereon and having a substantially flat base in contact with the flat top surface of the plate, each bowl having a central hole cut through to receive the respective post portion.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
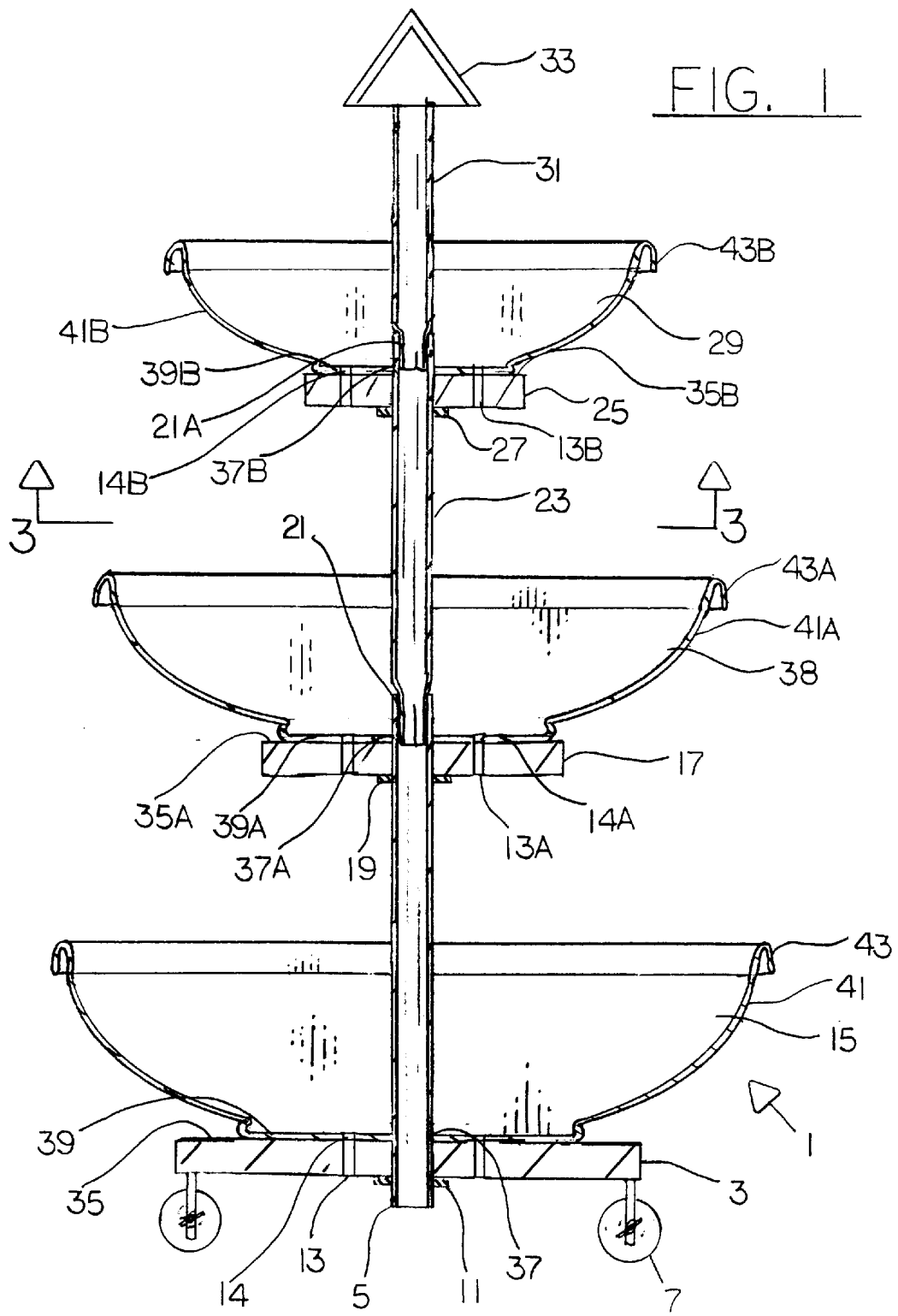
FIG. 1 is a vertical cross section of the present invention.
Figure 2:
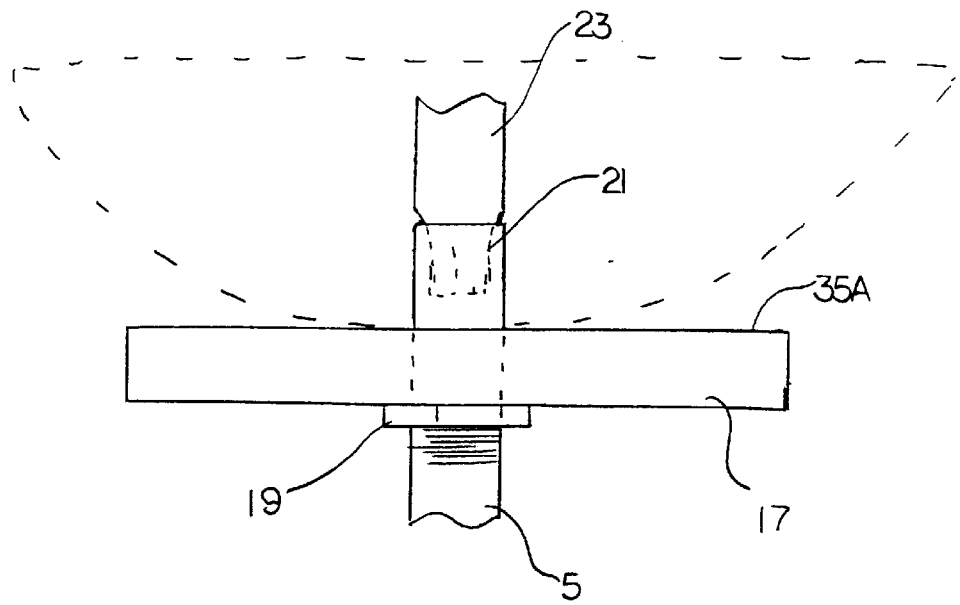
FIG. 2 is a front elevational view of one shelf of the present invention.
Figure 3:
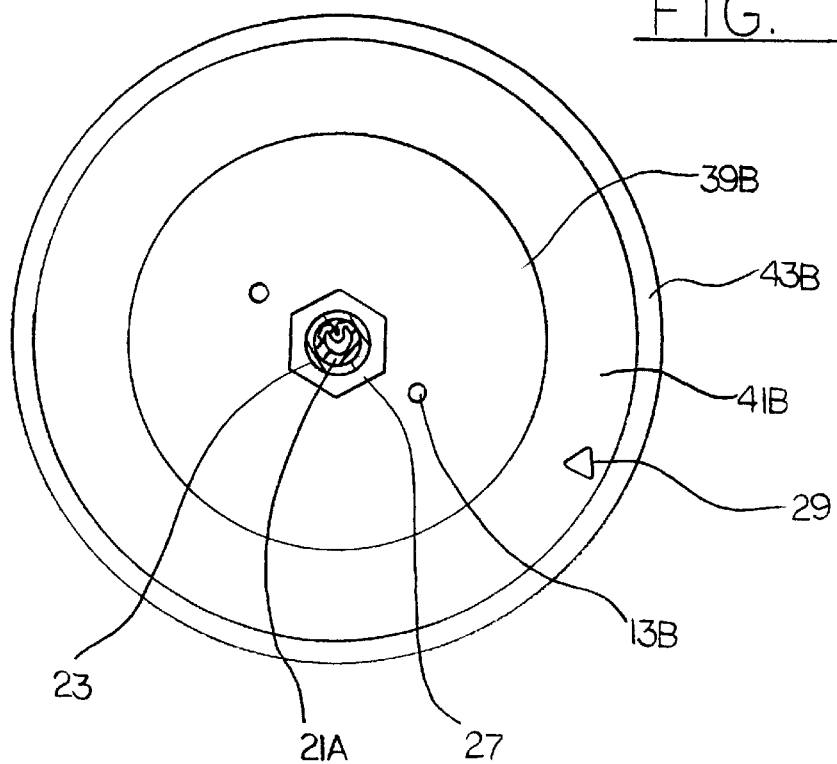
FIG. 3 is a bottom plan view.

A collapsible three tier tower 1 has a base 3 located at the bottom end of the bottom post 5. The base 3 is a disc which is positioned perpendicular to that of the bottom post 5. The base has a plurality of ground wheels 7 for moving the tower 1 across the ground. Directly in the center of the base the bottom post 5 extends vertically along the axis of the base 3. The bottom post 5 is threaded at the bottom end so as to be screwed through a fixed nut 11 mounted on the axis of the base 3.

The base 3 has two drainage holes 13, there also might be three, located on either side of the bottom post 5, to allow drainage from the first bowl 15. The base has a horizontal top surface 35 arranged to support the first bowl 15. The first bowl 15 has a hole 37 located directly in the flat bottom portion 39 of the first bowl and on the bowls axis, to allow the bottom post 5 to be inserted through for support. A side 41 of the bowl, which extends upward curving out then inward to the lip 43. Two drainage holes 14 located on either side of the post 5, positioned in such a way that they are aligned with the drainage holes 13 of the base 3.

The bottom post 5 extends vertically to a first support plate 17. The first support plate 17 is similar to that of the base 3 in which it is also a disc which is positioned perpendicular to that of the bottom post 5, two drainage holes 13A located on either side of the bottom post 5 to allow drainage from the second bowl 38. The first support plate 17 has a horizontal top surface 35A arranged to support the second bowl 38. The second bowl 38 has a hole 37A located directly in the flat bottom portion 39A and on the bowls axis, to allow the bottom post 5 to be inserted through for support.

The first support plate 17 has two drainage holes 13A located on either side of the bottom post 5, to allow drainage from the second bowl 38. First support plate 17 has a horizontal top surface 35A arranged to support the second bowl 38. The second bowl 38 has a hole 37A located directly in the flat bottom portion 39A of the second bowl 38 and on the bowls axis, to allow the bottom post 5 to be inserted through for support. A side 41A of the bowl, which extends upward curving out then inward to the lip 43A. Two drainage holes 14A located on either side of the post 5, positioned in such a way that they are aligned with the drainage holes 13A of the first support plate 17 and arranged to be parallel and aligned with the drainage hole 13 and 14 of the base 3 and the first bowl 15.

The bottom post 5 runs through the axis of the first support plate 17. The bottom post 5 has a second threaded portion in which a nut 19 is fixed to so as to support the first support plate 17 which acts as a base for a second bowl 38.

At the top end of the bottom post is a central post 23 which is pinched 21 at the bottom end and inserted into the bottom post 5 which extends vertically on the axis of the first support plate 17. A central post 23 extends vertically to a second support plate 25 where in the intersection of the second support plate and the central post, the central post is threaded and a second nut 27 is fixed to support the second support plate 25. The second support plate 25 works as a base for a third bowl 29. The second support plate 25 is a disc which is mounted parallel to that of the base 3 and of the first support plate 17. At the top end of the central post 23 is a top post 31 which is pinched 21A at the bottom end and inserted into the central post 23 which extends vertically and at the top end of the top post 31 is mounted a top 33.

The second support plate 25 has two drainage holes 13B located on either side of the central post 23, to allow drainage from the third bowl 29. The second support plate 25 has a horizontal top surface 35B arranged to support the third bowl 29. The third bowl 29 has a hole 37B located directly in the flat bottom portion 39B of the third bowl and on the bowls axis, to allow the central post 23 to be inserted through for support. A side 41B of the bowl, which extends upward curving out then inward to the lip 43B. Two drainage holes 14B located on either side of the post 23, positioned in such a way that they are aligned with the drainage holes 13B of the second support plate 25 and arranged to be parallel and aligned with the drainage hole 13, 13A and 14, 14A of the base 3, first support plate 17, the first bowl 15 and the second bowl 38

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A collapsible multi-tier plant container comprising:
   a base plate having a plurality of spaced ground engaging elements on an underside for supporting the base plate on the ground in horizontal orientation;
   a plurality of molded plastic plant bowls;
   a first post portion arranged for attachment to the base plate so as stand upwardly therefrom;
   a first raised plate for attachment to a top of the first post portion parallel to the base plate;
   a second post portion arranged for attachment so as stand upwardly from the first plate; and,
   a second raised plate for attachment to a top of the second post portion parallel to the base plate;
   each of the base plate, first plate and second plate having a substantially horizontal top surface;
   the first post portion being separable from the second post portion and each of the plates being separable from the post portions for collapsibility of the container;
   wherein each of the plates supports a respective one of the molded plastic bowls sitting thereon and having a substantially flat base in contact with the flat top surface of the plate, each bowl having a central hole cut through to receive the respective post portion.

2. The container according to claim 1 wherein the top surface of each of the plates has therein a plurality of holes arranged for alignment with holes in the bowl to allow escape of excess water from the bowl.

3. The container according to claim 1 wherein the ground engaging elements comprise wheels.

4. The container according to claim 1 wherein there is provided third post portion attached so as to stand upwardly from the second plate, the third post portion being separable from the second post portion.

5. The container according to claim 1 wherein the top surface of each plate portion has no raised peripheral rib.

6. The container according to claim 1 wherein there is provided a top ornament on top of a third post portion.

7. The container according to claim 1 wherein the top of the third post portion is supported solely from the first and second post portions and thus from the base plate.

8. The container according to claim 1 wherein the second post portion has a lower end portion which is of reduced diameter so as to fit into the top of the first post portion.

9. A collapsible multi-tier plant container comprising:
   a base plate having a plurality of spaced ground engaging elements on an underside for supporting the base plate on the ground in horizontal orientation:
   a first post portion arranged for attachment to the base plate so as stand upwardly therefrom;
   a first raised plate for attachment to a top of the first post portion parallel to the base plate;
   a second post portion arranged for attachment so as stand upwardly from the first plate; and,
   a second raised plate for attachment to a top of the second post portion parallel to the base plate;
   each of the base plate, first plate and second plate having a substantially horizontal top surface arranged to receive thereon a plant bowl;
   the first post portion being separable from the second post portion and each of the plates being separable from the post portions for collapsibility of the container;
   wherein each of the first plate and the base plate sits on a nut threaded onto a threaded section of the respective post portion.

10. The container according to claim 9 wherein the top surface of each of the plates has therein a plurality of holes arranged for alignment with holes in the bowl to allow escape of excess water from the bowl.

11. The container according to claim 9 wherein the ground engaging elements comprise wheels.

12. The container according to claim 9 wherein there is provided a third post portion attached so as to stand upwardly from the second plate, the third post portion being separable from the second post portion.

13. The container according to claim 9 wherein the top surface of each plate portion has no raised peripheral rib.

14. The container according to claim 9 wherein there is provided a top ornament on top of a third post portion.

15. The container according to claim 9 wherein the top of the third post portion is supported solely from the first and second post portions and thus from the base plate.

16. The container according to claim 9 wherein the second post portion has a lower end portion which is of reduced diameter so as to fit into the top of the first post portion.

* * * * *